(12) United States Patent
Kim (10) Patent No.: US 7,191,995 B2
(45) Date of Patent: Mar. 20, 2007

(54) SEAT SLIDE MECHANISM FOR VEHICLES (75) Inventor: Sang Ho Kim, Incheon (KR)

(73) Assignee: Kia Motors Corporation, Seoul (KR)

( * ) Notice: Subject to any disclaimer, the term of this patent is extended or adjusted under 35 U.S.C. 154(b) by 85 days.

(21) Appl. No.: 11/023,697

(22) Filed: Dec. 27, 2004

(65) Prior Publication Data
US 2006/0071140 A1    Apr. 6, 2006

(30) Foreign Application Priority Data
Oct. 2, 2004    (KR) .................. 10-2004-0078503

(51) Int. Cl.
*F16M 13/00*    (2006.01)
(52) U.S. Cl. ...................................... 248/429
(58) Field of Classification Search ............... 248/424, 248/430, 429, 419
See application file for complete search history.

(56) References Cited

U.S. PATENT DOCUMENTS 6,892,995 B2 *    5/2005    Tame et al. ............ 248/429

2003/0150971 A1 *    8/2003    Becker et al. ............ 248/429
2004/0238712 A1 *    12/2004    Oh ........................... 248/430

FOREIGN PATENT DOCUMENTS

| JP | 10-20020009239 | 2/2002 |
| JP | 10-20040026476 | 3/2004 |
| JP | 10-20040045538 | 6/2004 |

* cited by examiner

*Primary Examiner*—Ramon O Ramirez
(74) *Attorney, Agent, or Firm*—Morgan Lewis & Bockius LLP (57) ABSTRACT

The shape of a locker provided in a locking assembly for a seat slide mechanism is modified into a cylindrical structure with a circular cross section so as to exhibit a higher mechanical rigidity as compared to a conventional plate type locker. Thereby, effectively preventing a half-locked condition. A reinforced channel structure, of a combined hook configuration, enables an upper reinforced channel and a lower reinforced channel to perform mutual locking against upward loads, thus effectively preventing damage of the rail assembly upon the exertion of a load of a three-point-type seat belt for the middle or second seat.

11 Claims, 9 Drawing Sheets

SEAT SLIDE MECHANISM FOR VEHICLES

CROSS REFERENCE TO RELATED APPLICATION(S)

This application is based on, and claims priority to, Korean Patent Application No. 2004-78503, filed on Oct. 2, 2004, the disclosure of which is hereby incorporated by reference.

TECHNICAL FIELD OF THE INVENTION

The present invention generally relates to a seat slide mechanism for vehicles. More particularly, the seat slide mechanism includes a locker provided in a locking assembly and having a shape modified into a cylindrical structure with a circular cross section.

BACKGROUND OF RELATED ART

Typically, a seat for vehicles includes a slide mechanism that can move forwards and backwards to conform to the body shape of an occupant of the vehicle and a recliner that can adjust a tilt angle of a seat back. The slide mechanism typically refers to a device that enables forward and backward adjustment of the position of the vehicle seat. Such a typical seat slide mechanism basically includes a lower rail that is securely fixed to a vehicle body. An upper rail is rested on the lower rail and is movable forwards and backwards together with a seat cushion frame. A locking assembly serves to selectively perform a locking and an unlocking between the lower rail and the upper rail and an operating lever enables locking and unlocking of the locking assembly.

Several seat slide mechanism have been designed to improve upon this basic configuration, such as for example, Korean Patent Registration No. 374650 (Feb. 20, 2003). This registration discloses an improved locking assembly which attains structural simplicity, lightness in weight, improved fastenability, etc. The locking assembly is constructed such that a J-shaped hook attached to the upper rail and a $\Gamma$-shaped lower rail are fastened to each other along with a locker guide.

Also, Korean Patent Laid-Open Publication No. 2004-45538 discloses an improved locking assembly which includes a lever means, a locker operated cooperatively with the lever means, and an anti-shift bar so as to attain improved convenience in operation and high-grade functionality. The locking assembly is constructed such that a plate-shaped locker engages a locking hole formed at the lower rail so as to perform the operational confinement between the upper rail and the lower rail.

In addition, Korean Patent Laid-Open Publication No. 2004-26476 discloses an improved seat track structure for vehicles that includes a locking assembly. A locking plate is integrally coupled with a slide lever hingeably fixed to a side of the upper rail and moved vertically to lock and unlock into and from a hole formed at the lower rail so as to prevent its structural deformation and increase stability.

Such locking assemblies of the seat slide mechanism employs either a horizontal locking scheme that enables a locking and an unlocking between the upper rail and the lower rail depending on rightward and leftward movement of a locker or a vertical locking scheme which enables a locking and an unlocking between the upper rail and the lower rail based on upward and downward movement of the locker. The shape of the locker may be modified into various shapes including a plate-type hook shape, a plate-type trapezoidal shape, etc.

In the meantime, in the case where an RV or SUV vehicle has a seat arrangement of three rows or more, a two-person bench seat (6 side seat in a division ratio of 6 to 4) is applied to the second and third row seat. European countries stipulate an application of a three-point type seat belt for the middle seat to the second and third row seat. However, the conventional seat slide mechanism, intended to provide convenience to a passenger occupant seated on the second and third row, is structured such that it does not endure a mechanical strength of 3.2 ton/1 person required at the time of applying a three-point type seat belt for the middle seat.

That is, for such a conventional seat slide mechanism, there occurs a problem in that since it is structured to be applied to a one-person seat, if it is applied to a two-person bench seat, the seat slide structure is easily damaged (i.e., separated or widened) due to insufficient mechanical strength. Particularly, in the case where the three-point type seat belt for the middle seat is applied to the two-person bench seat, the slide mechanism is apt to be easily damaged as a result of its insufficient mechanical rigidity.

Furthermore, the conventional locker is formed of a plate-type hook shape or a plate-type trapezoidal shape. This does not sufficiently meet the mechanical strength required at the time of applying a three-point type seat belt for the middle seat. Moreover, in the case where an existing plate-type hook shaped (particularly, a horizontal locking scheme) locker is applied, there intermittently occurs a half-locked condition. As a result, when the body weight of a passenger is exerted to the seat or the seat is slightly moved due to inertia during traveling, the upper rail and the lower rail are often locked to each other while producing a "snap" sound. This contributes to serious deterioration of stability. There is therefore a need for an improved solution against the above drawbacks.

SUMMARY OF THE INVENTION

The present invention provides a seat slide mechanism for vehicles, in which the shape of a locker provided in a locking assembly is modified into an improved cylindrical structure with a circular cross section. The locker exhibits a higher mechanical rigidity as compared to a conventional plate type locker and effectively prevents a half-locked condition frequently occurring in the plate type locker. A reinforced channel structure of a combined hook configuration enables an upper reinforced channel and a lower reinforced channel to perform a mutual locking against upward loads. The reinforced channel structure is installed at the rear end portion of a rail assembly so as to effectively prevent damage of the rail assembly upon the exertion of a load of a three-point-type seat belt for the middle or second seat.

To accomplish the above object there is provided a seat slide mechanism for vehicles that includes a lower rail securely fixed to a vehicle body and has a plurality of locking holes longitudinally formed in an inner side wall. The holes are spaced apart from one another at equal intervals. An upper rail is rested on the lower rail and is movable forwards and backwards together with a seat cushion frame. The upper rail has a plurality of through-holes formed in the inner and outer side walls to correspond to associated ones of the plurality of locking holes of the lower rail. A locking assembly serves to selectively perform a locking and an unlocking between the lower rail and the upper rail. An operating lever enables a locking and unlocking of the locking assembly and has an operating bracket integrally coupled with each of both opposite ends. The operating lever extends rearwards of the operating lever.

The locking assembly includes a plurality of pin-shaped lockers spaced-apart from, and in parallel with, one another at equal intervals. The lockers can move forwards and backwards through the plurality of through-holes of the upper rail and can fit at front end portions thereof into associated ones of the plurality of locking holes of the lower rail via the through-holes of the upper rail. Each of the lockers moves forwards through an elastic restoring force of a return spring wrapped around the rear portion thereof for elastic operation to a locked condition between the lower rail and the upper rail. A support means is fixedly fastened to an inner wall of the upper rail and adapted to guidably support the plurality of pin-shaped lockers, such that the lockers move forwards and backwards through the plurality of through-holes of the upper rail. A pulling means is hingeably coupled to the support means and has a plurality of fitting grooves formed at a front end thereof for allowing the plurality of lockers to be fit thereto and retained therein. The pulling means also has a pressing end extending rearwards whereby the pulling means is pivotally rotate when the pressing end of the pulling means is downwardly pressed by the operating bracket. Therefore, the plurality of lockers are pulled rearwards to escape from the locking holes of the lower rail to an unlocked condition between the lower rail and the upper rail.

Preferably, each of the lockers have a circular cross section and are formed at the front end portion. The lockers also have a tapered portion of a truncated-conical shape that is gradually decreased in diameter to be inserted into each of a plurality of locking holes of the lower rail. Also preferably, the support means may be securely fixed at both side portion to the inner side wall of the upper rail with the pulling means hingeably coupled to a pair of opposite hinge portions of a lower side end thereof. The support means is adapted to guidably support the lockers in such a fashion that the lockers fit into a plurality of through-holes formed in a transversely extending portion of the support means. The support means is also adapted to support the other end of the return spring. One end of the return spring is supported by a support step protrudingly extending radially from the outer circumferential surface of the locker.

More preferably, the support means may be formed with a stopper horizontally extending rearwards of the central top end of the transversely extending portion thereof for preventing reverse movement of the operating bracket. Also, preferably, the pulling means is formed at an upper end portion of a fork-tine shape in its entirety with a plurality of fitting grooves arranged spaced apart from one another at equal intervals for allowing the lockers to be fit thereto. Therefore, a retaining step radially protruded outwardly from the outer circumferential surface of the locker is locked in the fitting grooves of the pulling means in a state where the lockers are fit into the fitting grooves of the pulling means.

Also preferably, a reinforced channel structure of a mutual combined hook configuration in the form of encircling the lower and upper rails inwardly from the outside is installed at a certain area of the rear end portions of the lower and upper rails that are basically mounted.

Further preferably, the reinforced channel structure includes an upper reinforced channel structured. The upper reinforced channel structure provides a coupling assembly of the lower rail and the upper rail, encircled at the upper side by a certain length interval, in such a fashion as to be interposed between the cushion frame and the upper rail and is fastened to the cushion frame and the upper rail. A lower reinforced channel structured is provided such that the coupling assembly of the lower rail and the upper rail is encircled at the lower side by a certain length interval in such a fashion as to be fixed to the vehicle body along with the lower rail. The upper reinforced channel and the lower reinforced channel are constructed of a mutual combined hook configuration in which the two reinforced channels are engaged with each other against an upward load by bending both side ends thereof in the form of U-shape.

BRIEF DESCRIPTION OF THE DRAWINGS

The above and other objects, features and advantages of the present invention will be apparent from the following detailed description of the preferred embodiments of the invention read in conjunction with the accompanying drawings, in which:

FIG. 1b is a top plan view of the seat frame of FIG. 1a;

DETAILED DESCRIPTION OF PREFERRED EMBODIMENTS

Figure 1A:
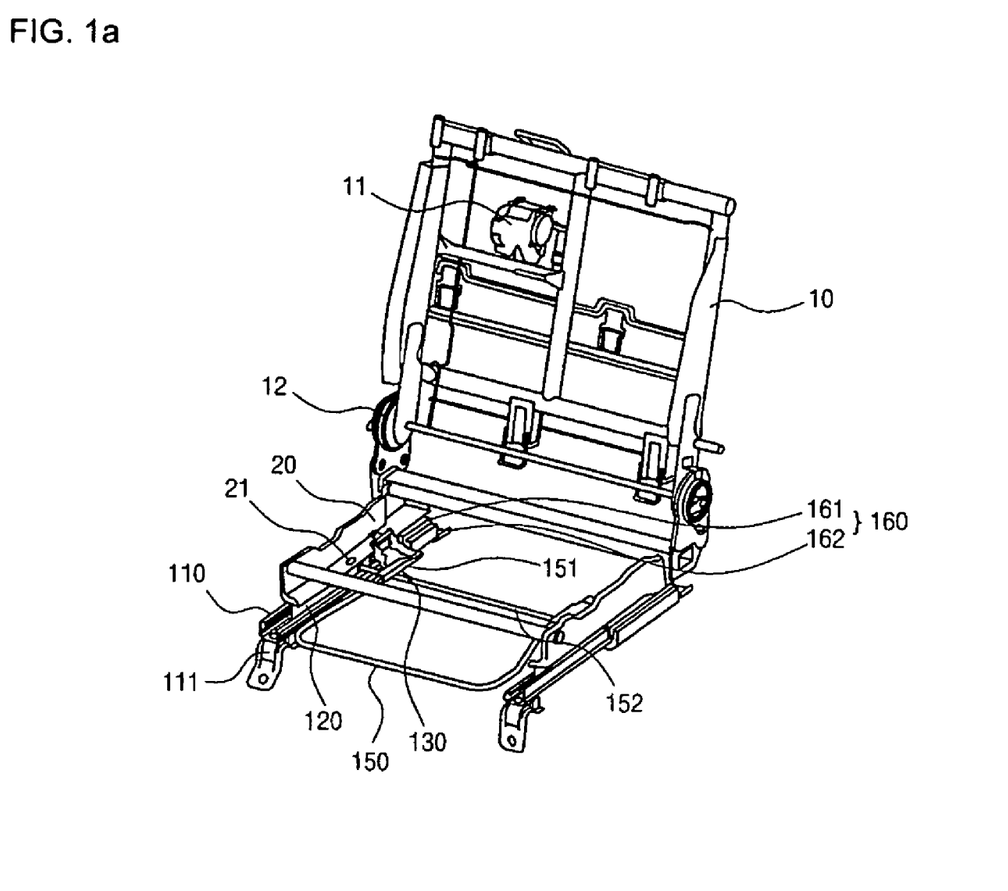
FIG. 1a is a perspective view of a seat frame to which a seat slider mechanism for vehicles is applied, according to an embodiment of the present invention.
Figure 1B:
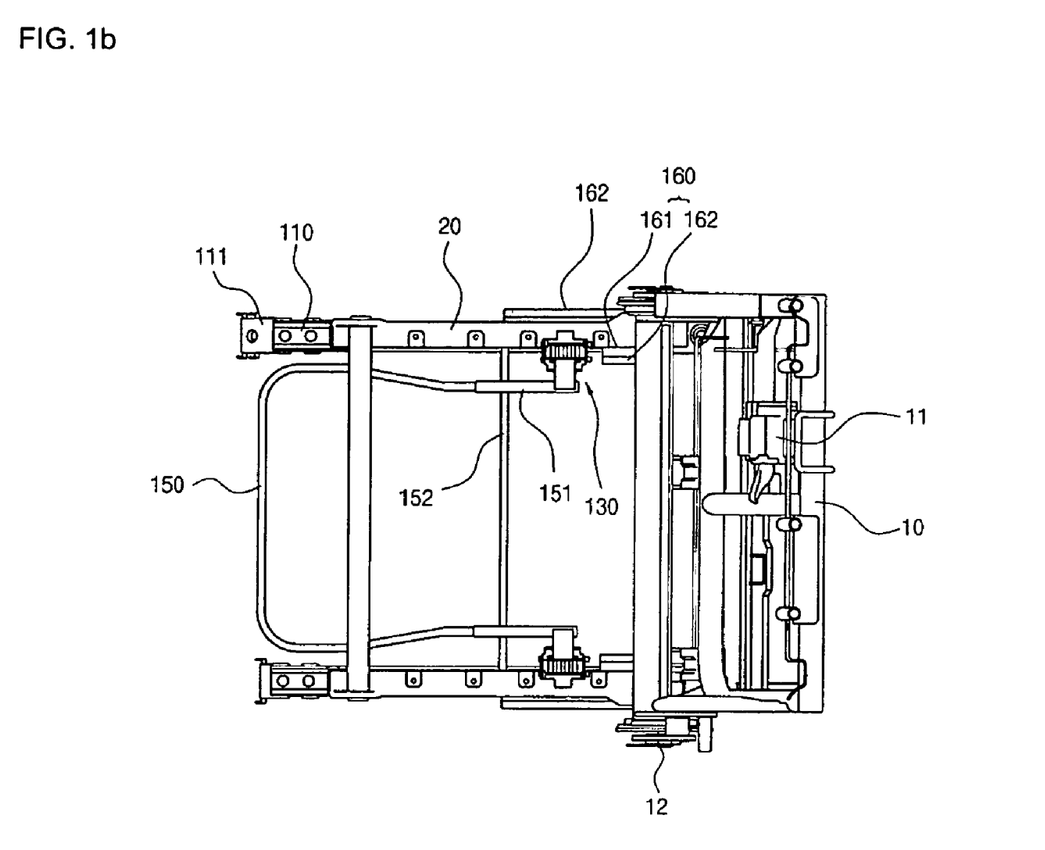

According to FIGS. 1a and 1b, a retractor 11 included in a three-point type seat belt for the middle seat is mounted on a seat frame 10. A lower cushion frame 20 is connected to the seat frame 10 by means of a recliner 12 and is integrally coupled with an upper rail 120 so that it can move forwards and backward on a lower rail 110 fixed to a vehicle body. The seat slide mechanism according to the present invention includes a lower rail 110 that is securely fixed to a vehicle body. An upper rail 120 is rested on the lower rail 110 and is movable forwards and backwards, with respect to the lower rail 110, together with a seat cushion frame 20. A locking assembly 130 serves to selectively perform a locking and an unlocking between the lower rail 110 and the upper rail 120, and an operating lever 150 enables a locking and unlocking of the locking assembly 130.

The lower rail 110 is securely fixed at both front and rear ends to the vehicle body by means of a mounting bracket 111. The upper rail 120 is fixedly coupled to the cushion frame 20 disposed thereon by means of a fastening means 21, see FIG. 2a, such as a rivet for example, so that it is slidably moved forwards and backwards along with the cushion frame 20 in the inside of the lower rail 110.

Reference numeral 130 denotes a locking assembly that selectively performs a locking and an unlocking between the lower rail 110 and the upper rail 120. An operating lever 150 enables a locking and unlocking operation of the locking assembly 130.

Referring to FIGS. 1a and 1b, right and left slide assemblies including the lower and upper rails 110 and 120 are constructed to be symmetrical to each other. The locking assembly 130 is also constructed to be identical at right and left sides to each other. A generally "U"-shaped operating lever 150 is employed to simultaneously operate the right and left side locking assemblies 130.

An operating bracket 151 is integrally coupled with both opposite ends of the operating lever 150 in such a fashion as to lengthily extend rearwards of the operating lever 150. Each of the right and left side operating brackets 151 is coupled, for example, by welding, on a rotational shaft 152 mounted on the right and left side upper rails 120 in such a fashion as to transversely extend between the right and left side upper rails 120. Therefore, the operating lever 150 an the operating bracket 151 are supported by a rotational shaft 152.

Figure 2A:
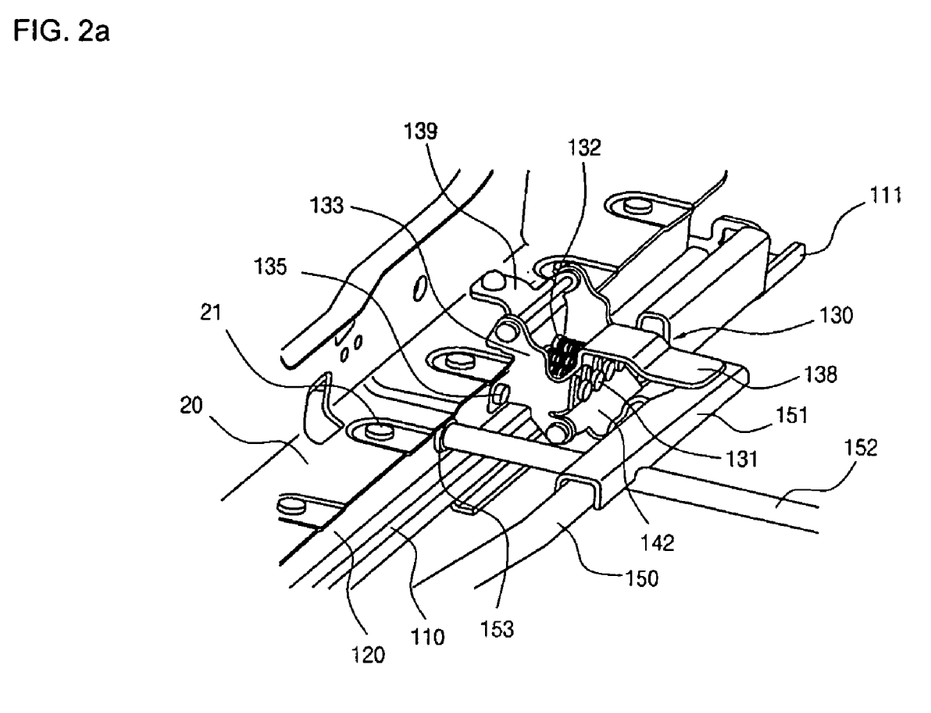
FIGS. 2a and 2b are perspective views of a locking assembly of a seat slide mechanism for vehicles according to an embodiment of the present invention when viewed from different directions.
Figure 2B:
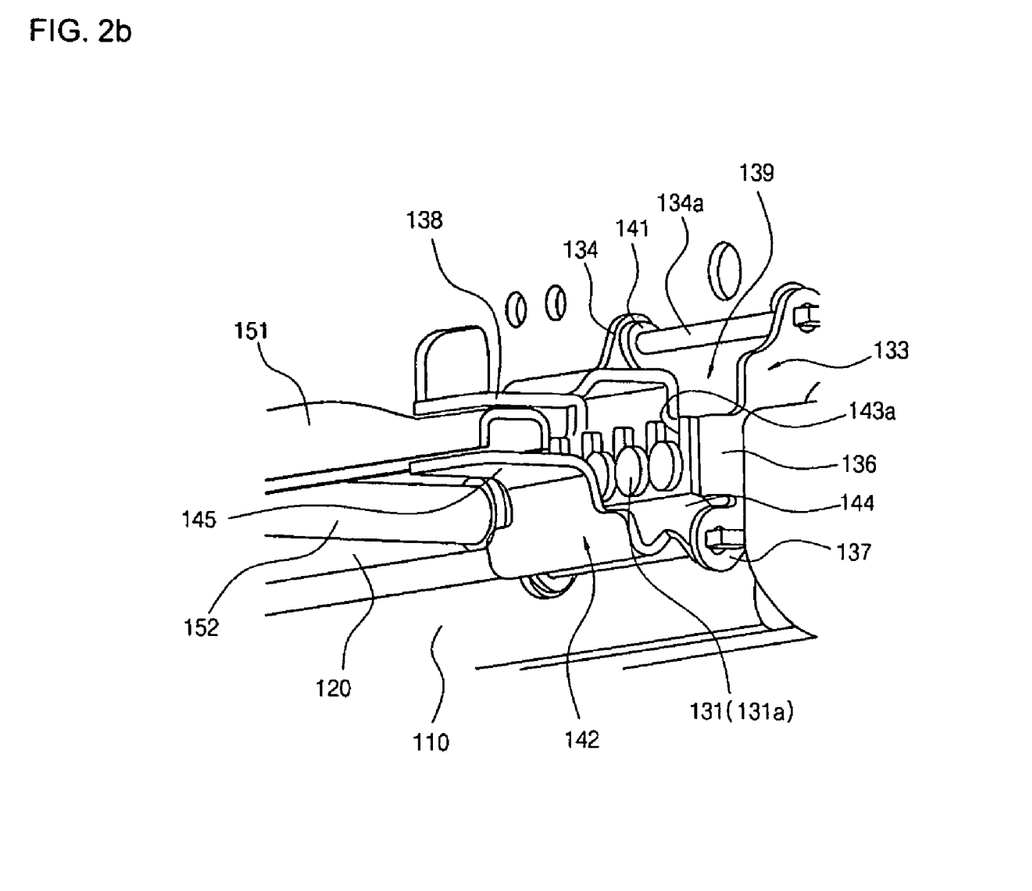
Figure 3:
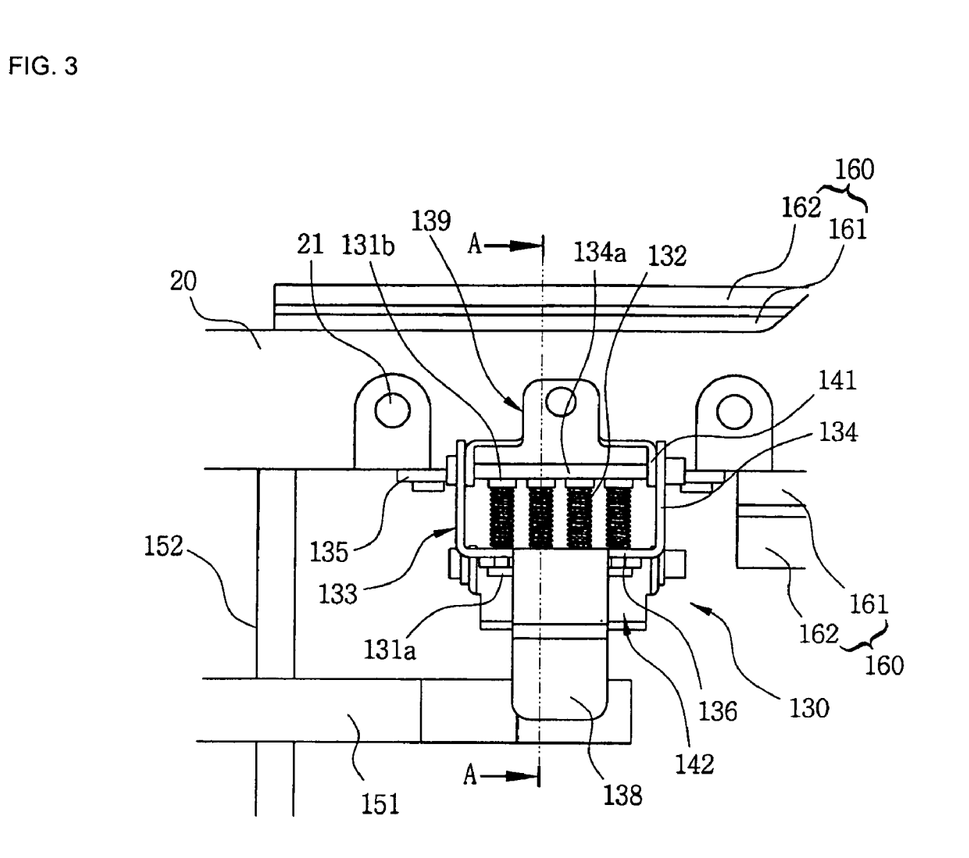
FIG. 3 is a top plan view of a locking assembly of a seat slide mechanism for vehicles according to an embodiment of the present invention.
Figure 4:
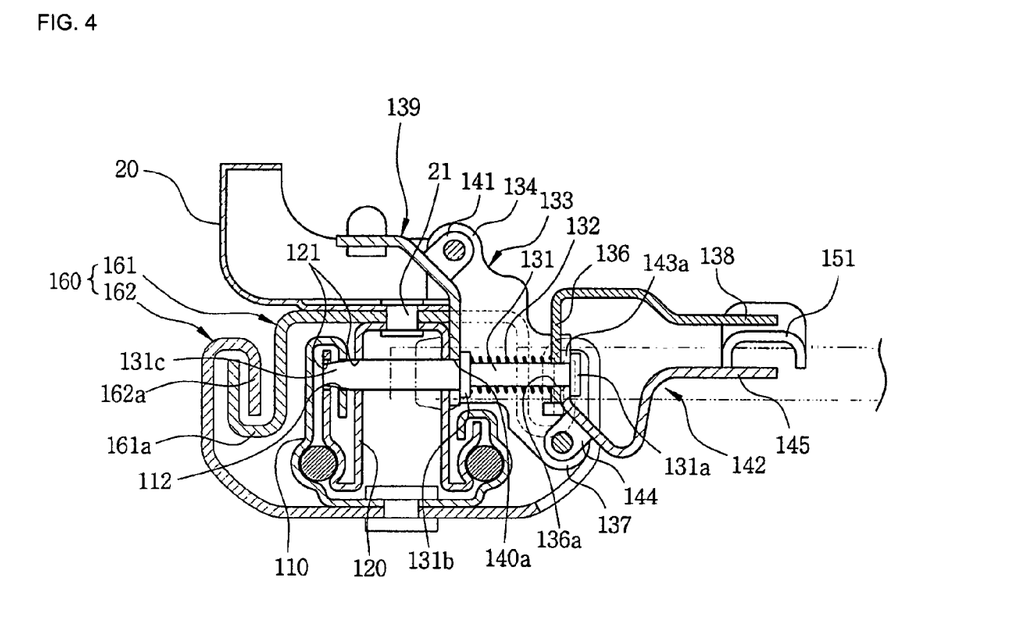
FIG. 4 is a cross sectional view taken along the line A—A of FIG. 3.
Figure 5:
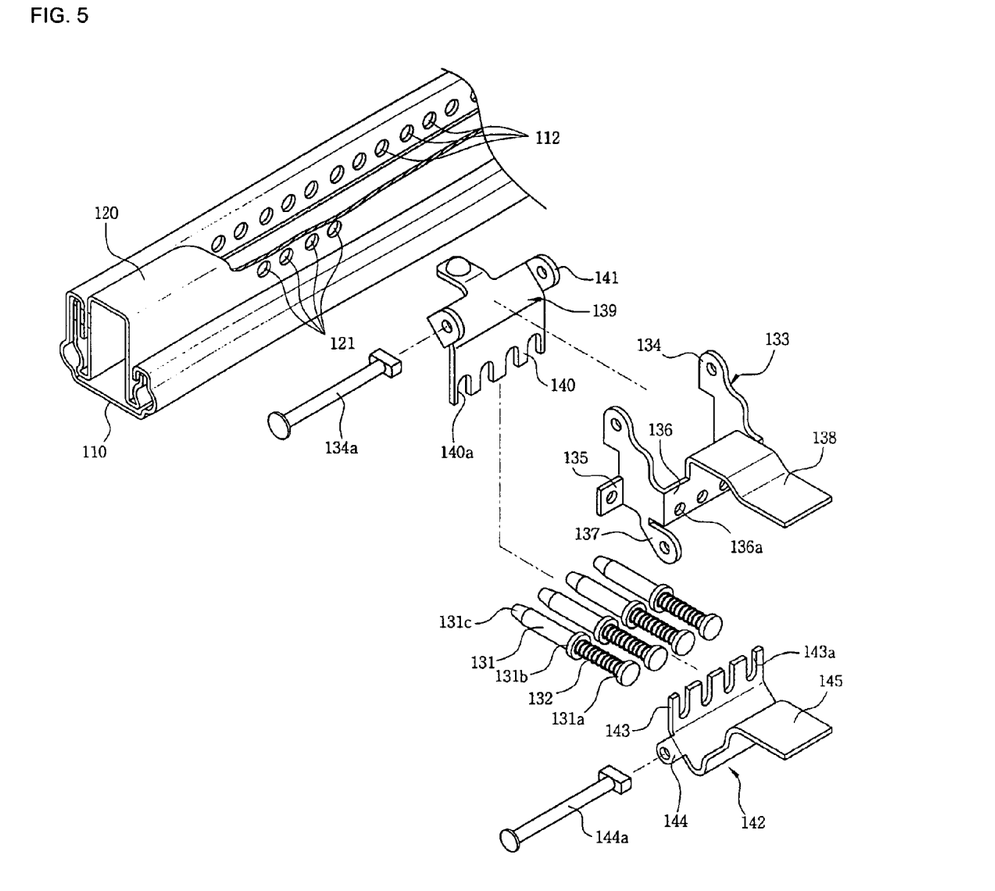
FIG. 5 is an exploded perspective view of a locking assembly employed in a seat slide mechanism for vehicles according to an embodiment of the present invention.

The rotational shaft 152 is rotatably connected and mounted to the right and left side upper rails 120. Both ends of the rotational shaft 152 are rotatably coupled to the inner walls of both the upper rails 120, respectively. A bush 153, see FIGS. 2a and 2b, is interposed between both the upper rails 120 and the rotational shaft 152, respectively, so that the rotational shaft 152 can smoothly rotate by virtue of the bush 153. As a result, when the operating lever 150 is pulled upwardly, the operating bracket 151 is moved downwardly while rotating the rotational shaft 152. By this operation, the locking assembly 130, described elsewhere, is operated to an unlocked condition between the lower rail and the upper rail. In addition, when the operating lever 150 is released, the locking assembly 130 is automatically returned to a locked condition between the lower and upper rails 110 and 120 by the locker 131 by the elastic restoring force of a return spring 132 embedded in the locking assembly 130. At this time, the operating bracket 151 is pushed upward and simultaneously the operating lever 150 moves downward, returning to an original position.

FIGS. 2a and 2b are perspective views of a locking assembly 130 of the seat slide mechanism. The locking assembly 130 is a component for performing a locking and an unlocking between the lower rail 110 and the upper rail 120 in cooperation with the operating lever 150. The locking assembly 130 employs a plurality of pin-shaped lockers 131 of a circular cross section. The plural pin-shaped lockers 131 are supported by a support means, i.e., a first support bracket 133 fixedly fastened to an inner wall of the upper rail 120, and are arranged spaced-apart from and in parallel with one another at equal intervals. Each locker 131 is formed at a rear end portion thereof with a retaining step 131a radially protruding outward from the outer circumferential surface. Each locker 131 is also formed, at an intermediate portion thereof, with a support step 131b radially protruding outward from the outer circumferential surface thereof. Each locker 131 is further formed, at a front end portion thereof, with a tapered portion having a truncated-conical shape being gradually decreased in diameter and configured to be inserted into each of a plurality of locking holes 112 of the lower rail 110.

Each locker 131 is fit at a rear end portion thereof into each fitting groove 143a of a pulling bracket 142, described elsewhere, so that the retaining step 131a of the locker 131 is locked to the pulling bracket 142. At this time, all the plural lockers 131 can be simultaneously pulled rearwards of the lockers by virtue of the pivotal rotation of the pulling bracket 142. Also, each locker 131 is fit at an intermediate portion thereof into each fitting groove 140a of a second support bracket 139, described elsewhere, so that the support step 131b of the locker 131 is locked to the second support bracket 139.

Each of the lockers 131 is supported at both sides thereof by the first support bracket 133 and the second support bracket 139. Each locker 131 can be simultaneously moved forwards and rearwards while sequentially passing through each of the plurality of through-holes 121 formed in the inner and outer side walls of the upper rail 120. When the locker 131 is moved forwards, the front end portion, i.e., the tapered portion 131c of the locker 131, is inserted into each of the locking holes 112 formed in an inner side wall of the lower rail 110 via each of the plurality of through-holes 121. Thus, forming a locked condition between the lower rail 110 and the upper rail 120. On the other hand, when the locker 131 is moved rearwards, the tapered portion 131c of the locker 131 escapes from the locking hole 112 of the lower rail 110 to an unlocked condition between the lower rail 110 and the upper rail 120.

The plurality of locking holes 112 are longitudinally formed in an inner side wall of the lower rail 110 in such a fashion as to be spaced apart from one another at equal intervals. The lockers 131 can be locked to selected ones of the locking holes 112 in an adjusted seat position on the lower rail 110. A return spring 132 is wrapped around the outer circumferential surface of a rear portion of the locker 131. Particularly, the return spring 132 is supported at one end thereof by the support step 131b of the locker 131 and at the other end thereof by a transversely extending wall portion 136 of the first support bracket 133. When the pulling bracket 142 simultaneously pulls the lockers 131 through the retaining step 131a of the locker 131 upon its pivotal rotation, the return spring 132 is resiliently compressed between the support step 131b of the locker 131 and the transversely extending wall portion 136 of the first support bracket 133 to an unlocked condition between the lower and upper rails 110 and 120. Thereafter, the pulling state of the pulling bracket 142 is released, the plurality of lockers 131 are simultaneously moved forwards by virtue of the elastic restoring force of the return spring 132 to be returned to their original positions to a locked condition between the lower and upper rails 110 and 120.

As such, each of the lockers 131 employed in the present invention has a pin shape of a circular cross section, i.e., a cylindrical shape, for example. Especially, since such a pin-shape locker has a high section modulus, its strength is greater than that of the conventional plate-type locker. Thus, the shape of the locker 131 is suitable as a locking means of the seat slide mechanism in case of application of a three-point type seat belt for the middle seat.

Meanwhile, the first support bracket 133 has a transversely extending wall portion 136, a pair of opposite hinge portions 134 extending forwards and slantedly upwardly from both lateral ends of the transversely extending wall portion 136 thereof. A pair of side pieces 135 extend perpendicular to and outwardly from both ends of the pair of opposite hinge portions 134. The second support bracket 139 has a pair of opposite side hinge portions 141 extending rearwards from both lateral ends of the second support bracket 139 in such a manner as to be oriented toward the opposite hinge portions 134. The first support bracket 133 is structure such that the pair of opposite hinge portions 134 thereof is hingeably coupled to the pair of opposite side hinge portions 141 of the second support bracket 139 by means of a hinge shaft 134a. The pair of side pieces 135 thereof is fastened to the inner wall of the upper rail 120 by means of rivets so that the first support bracket 133 is fixed to the upper rail 120 in its entirety.

In addition, the transversely extending wall portion 136 of the first support bracket 133 is formed thereon with a plurality of through-holes 136a arranged to be spaced apart from one another at equal intervals for allowing the lockers 131 to be inserted thereto. The first support bracket 133 also has a pair of opposite hinge pieces 136a extending slantedly rearwardly from lower ends of the first opposite hinge portions 133 thereof so that the pulling bracket 142 is hingeably coupled to the first support bracket 133. A stopper 138 extends horizontally rearwards of the central top end of the transversely extending wall portion 136 of the first support bracket 133. Therefore, the operating bracket 151 is positioned between the stopper 138 of the first support bracket 133 and the pressing end 145 of the pulling bracket 142.

The first support bracket 133 serves to support the plurality of lockers 131 mounted in the transversely extending wall portion 136 thereof and the return spring 132 for enabling elastic operation of the lockers 131. The first support bracket 133 also serves to prevent the upward movement of the operating bracket 151 through the stopper 138 and rotatably support the pulling bracket 142.

The second support bracket 139 is hingeably coupled, at the pair of opposite side hinge portions 141, to the pair of opposite hinge portions 134 of the first support bracket 133 by means of a hinge shaft 134a. The second support bracket 139 is formed, at a lower end portion 140, with a plurality of fitting grooves 140a. The fitting grooves 140a are arranged and spaced apart from one another at equal intervals for allowing the lockers 131 to be fit thereto. As such, the lower end portion 140 of the second support bracket 139 is of a fork-tine shape in its entirety. The second support bracket 139 supports the lockers 131 in such a fashion that each support step 131b of the locker 131 is fit into a corresponding fitting groove 140a of the lower end portion 140 of the second support bracket 139.

The pulling bracket 141 serves to simultaneously pull the plural lockers 131 toward an unlocked position, between the lower and upper rail, in cooperation with the operating bracket 151 being pivoted downward. The pulling bracket 141 is formed at one side end thereof with a pressing end 145 horizontally extending rearwards thereof so that the pressing end 145 can be pressed downward by the operation bracket 141. Further, the pulling bracket 141 has a pair of hinge portions 144. The hinge portions 144 protrudingly extend outward from opposite side ends of a lower portion thereof, so that the hinge portions 144 are hingeably coupled to the pair of lower opposite hinge pieces 137 of the first support bracket 133 by means of a hinge shaft 144a. Thus, the pulling bracket 141 is structured such that it can pivotally rotate with respect to the first support bracket 133. Additionally, an upper end portion of the pulling bracket 142 is formed with a plurality of fitting grooves 143a. The plurality of fitting grooves 143a are arranged and spaced apart from one another at equal intervals for allowing the lockers 131 to be fit thereto. In this case, the upper end portion 143 of the second support bracket 139 is of a fork-tine shape in its entirety.

Particularly, the upper end portion 143 of pulling bracket 142 is positioned between the retaining steps 131a of the lockers 131 and the transversely extending wall portion 136 of the first support bracket 133. Therefore, when the pressing end 145 of the pulling bracket 142 is pushed downward, in response to the downward pivoting of the operating bracket 151, the pulling bracket 142 simultaneously pulls the lockers 131 with the retaining steps 131a of the lockers 131 retained in the fitting grooves 143a thereof while pivotally rotating. In this manner, when a user pulls the operating lever 150 upward, the operating bracket 151 is downward pivoted about the rotational shaft 152 while downwardly pressing the pressing end 145 of the pulling bracket 142. At this time, the pulling bracket 142 pivotally rotates about the hinge shaft 144a while simultaneously pulling the lockers 131, so that the lockers escape from the locking holes 112 of the lower rail 110 to an unlocked condition between the lower and upper rails.

On the other hand, when the user let the operating lever 150 go, the pulling force of the pulling bracket 142 is released while the lockers 131 return to the original position by virtue of the elastic restoring force of the return springs 131. Simultaneously the lockers 131 are inserted into the locking holes 112 of the lower rail 10 via the through-holes 121 of the upper rail 120 to a locked condition between the lower and upper rails 110 and 120. At this time, the pulling bracket 142 pivotally rotates toward its original position while upwardly pushing the operating bracket 151 so that the operating bracket 151 is pivoted upward about the rotational shaft 152 while automatically pushing the operating lever 150 downward.

Figure 6:
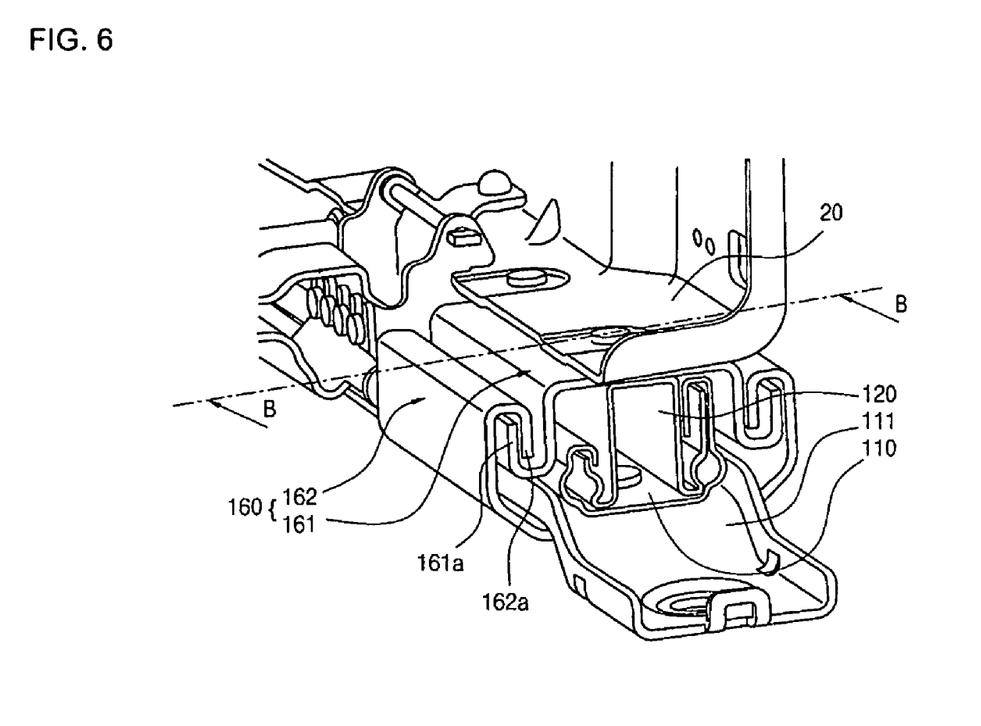
FIG. 6 is a perspective view of the construction and installation state of reinforced channel structure provided at the rear end portions of an upper rail and a lower rail according to an embodiment of the present invention.
Figure 7:
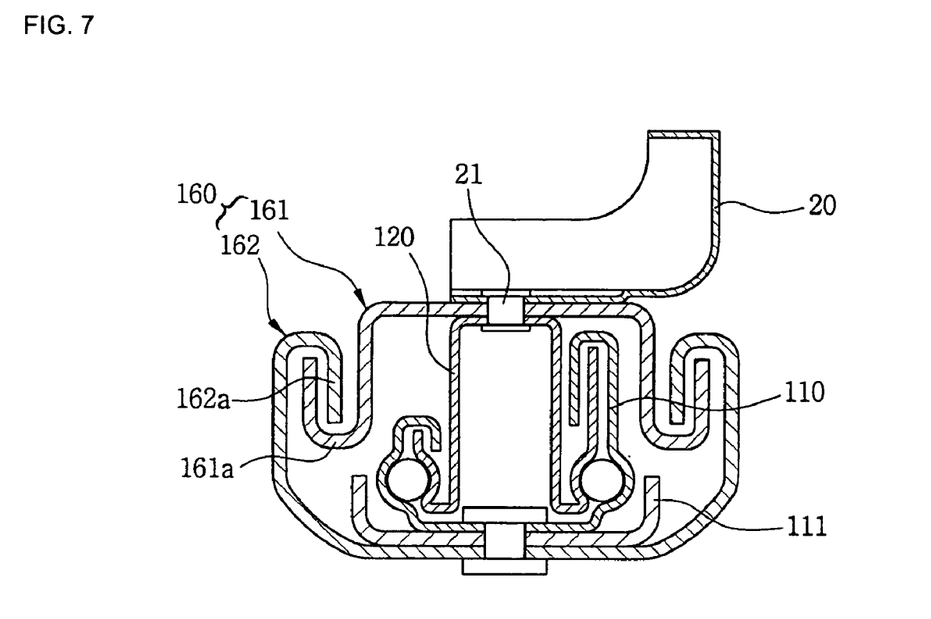
FIG. 7 is a cross sectional view taken along the line B—B of FIG. 6.

In the meantime, in the case where a three-point type seat belt for the middle seat is applied to the vehicle seat, the retractor 11 is mounted on an inner side of a seat back frame 110 so that a load-supporting point is positioned at a seat back side. Accordingly, upon collision against other vehicles, a load exerted on the seat of an occupant through a seat belt that he or she wears is transformed into a force which upwardly lifts a rear end portion of a seat cushion. In this manner, a large load is exerted upward from the rear end portion of the seat cushion so that there may easily occur physical damage such as separation or widening at the rear end portions of the lower rail 110 and the upper rail 120. In order to address this problem, the seat slide mechanism according to the present invention employs a double reinforced hook structure which surrounds the rear end portions of the lower and upper rails 110 and 120 as shown in FIGS. 6 and 7. That is, a separate reinforced channel structure 160 of a mutual combined hook configuration in the form of encircling the two rails inwardly from the outside is additionally installed at a certain area of the rear end portions of the lower and upper rails 110 and 120. The reinforced channel structure 160 includes an upper reinforced channel 161 and a lower reinforced channel 162.

The upper reinforced channel 161 is structured such that a coupling assembly of the lower rail 110 and the upper rail 120 is encircled at the upper side by a certain length interval in such a fashion as to be interposed between the cushion frame 20 and the upper rail 120 and fastened to the cushion frame 20 and the upper rail 120. The lower reinforced channel 162 is structured such that the coupling assembly of the lower rail 110 and the upper rail 120 is encircled at the lower side by a certain length interval in such a fashion as to be fixed to the vehicle body by means of a mounting bracket 11 along with the lower rail 110. The upper reinforced channel 161 and the lower reinforced channel 162 are constructed of a mutual combined hook configuration in which the two reinforced channels are engaged with each other against an upward load by bending both side ends 161a and 161b thereof in the form of U-shape. Accordingly, although a large upward load is exerted on the rear end portion of the seat, the two reinforced channels 161 and 162 share the load together with the lower and upper rail 110 and 120 installed therein with the aid of the mutual combined hook configuration, thereby preventing physical damage.

As described above, according to the seat slide mechanism for vehicles, the shape of a locker provided in a locking assembly is modified into an improved cylindrical structure with a circular cross section so as to exhibit a higher mechanical rigidity as compared to a conventional plate type locker. Moreover, since a locker, employed in the present invention, is formed of a cylindrical shape, it slidably fits into the locking holes of the lower rail, thereby effectively preventing the a half-locked condition that frequently occurs in the conventional plate type locker. In addition, the upward and downward pivotal rotation of the operating lever is transmitted to the linear movement of the locker so that a locked and unlocked condition is effected between the lower and upper rails. Thus, in spite of a wide two-person seat slide lever, the operating power is saved significantly. Furthermore, a reinforced hook structure is applied to the rear end portions of the rail coupling assembly so that physical damage of the rail coupling assembly can be effectively prevented upon the exertion of a load of a three-point-type seat belt for the middle seat and application of a three-point-type seat belt for the middle seat is possible. Thereby satisfy the requirements of the vehicle stipulations and improving quality of the vehicles.

While the present invention has been described with reference to the particular illustrative embodiments, it is not to be restricted by the embodiments but only by the appended claims. It will be appreciated by those skilled in the art that changes and modifications to the embodiments disclosed can be made without departing from the scope and spirit of the present invention as defined in the appended claims.

What is claimed is:

1. A seat slide mechanism for vehicles, comprising:
   a lower rail which is securely fixed to a vehicle body and has a plurality of locking holes longitudinally formed in an inner side wall thereof in such a fashion as to be spaced apart from one another at equal intervals;
   an upper rail which is rested on the lower rail and is movable forwards and backwards together with a seat cushion frame, the upper rail having a plurality of through-holes formed in the inner and outer side walls thereof to correspond to associated ones of the plurality of locking holes of the lower rail;
   a locking assembly which serves to selectively perform a locking and an unlocking between the lower rail and the upper rail; and
   an operating lever which enables a locking and an unlocking of the locking assembly and has an operating bracket integrally coupled with each of both opposite ends thereof in such a fashion as to lengthily extend rearwards of the operating lever;
   wherein the locking assembly includes;
   a plurality of pin-shaped lockers arranged spaced-apart from and in parallel with one another at equal intervals such that the lockers can move forwards and backwards through the plurality of through-holes of the upper rail, and can fit at front end portions thereof into associated ones of the plurality of locking holes of the lower rail via the through-holes of the upper rail in a state where each of the lockers moves forwards through an elastic restoring force of a return spring wrapped around the rear portion thereof for elastic operation to a locked condition between the lower rail and the upper rail;
   a support means fixedly fastened to an inner wall of the upper rail and adapted to guidably support the plurality of pin-shaped lockers such that the lockers move forwards and backwards through the plurality of through-holes of the upper rail; and
   a pulling means hingeably coupled to the support means and having a plurality of fitting grooves formed at a front end thereof for allowing the plurality of lockers to be fit thereto and retained therein and a pressing end extending rearwards thereof, whereby the pulling means is pivotally rotate when the pressing end of the pulling means is downwardly pressed by the operating bracket so that the plurality of lockers are pulled rearwards to escape from the locking holes of the lower rail to an unlocked condition between the lower rail and the upper rail.

2. The seat slide mechanism for vehicles according to claim 1, wherein each of the lockers has a circular cross section and is formed at the front end portion thereof with a tapered portion of a truncated-conical shape which is gradually decreased in diameter to be inserted into each of a plurality of locking holes of the lower rail.

3. The seat slide mechanism for vehicles according to claim 1, wherein the support means is securely fixed at both side portion thereof to the inner side wall of the upper rail with the pulling means hingeably coupled to a pair of opposite hinge portions of a lower side end thereof, the support means being adapted to guidably support the lockers in such a fashion that the lockers are fit into a plurality of through-holes formed in a transversely extending portion of the support means and being adapted to support the other end of the return spring one end of which is supported by a support step protrudingly extending radially from the outer circumferential surface of the locker.

4. The seat slide mechanism for vehicles according to claim 3, wherein the support means is formed with a stopper horizontally extending rearwards of the central top end of the transversely extending portion thereof for preventing the reverse movement of the operating bracket.

5. The seat slide mechanism for vehicles according to claim 3, wherein the pulling means is formed at an upper end portion of a fork-tine shape in its entirety with a plurality of fitting grooves arranged spaced apart from one another at equal intervals for allowing the lockers to be fit thereto, so that a retaining step radially protruded outwardly from the outer circumferential surface of the locker is locked in the fitting grooves of the pulling means in a state where the lockers are fit into the fitting grooves of the pulling means.

6. The seat slide mechanism for vehicles according to claim 1, wherein a reinforced channel structure of a mutual combined hook configuration in the form of encircling the lower and upper rails inwardly from the outside is installed at a certain area of the rear end portions of the lower and upper rails which are basically mounted.

7. The slider rail according to claim 6, wherein the reinforced channel structure includes:
   an upper reinforced channel structured such that a coupling assembly of the lower rail and the upper rail is encircled at the upper side by a certain length interval in such a fashion as to be interposed between the cushion frame and the upper rail and fastened to the cushion frame and the upper rail; and
   a lower reinforced channel structured such that the coupling assembly of the lower rail and the upper rail is encircled at the lower side by a certain length interval in such a fashion as to be fixed to the vehicle body along with the lower rail;

wherein the upper reinforced channel and the lower reinforced channel are constructed of a mutual combined hook configuration in which the two reinforced channels are engaged with each other against an upward load by bending both side ends thereof in the form of U-shape.

8. The seat slide mechanism for vehicles according to claim 1, wherein the support means is formed with a stopper horizontally extending rearwards of the central top end of the transversely extending portion thereof for preventing the reverse movement of the operating bracket.

9. The seat slide mechanism for vehicles according to claim 1, wherein the pulling means is formed at an upper end portion of a fork-tine shape in its entirety with a plurality of fitting grooves arranged spaced apart from one another at equal intervals for allowing the lockers to be fit thereto, so that a retaining step radially protruded outwardly from the outer circumferential surface of the locker is locked in the fitting grooves of the pulling means in a state where the lockers are fit into the fitting grooves of the pulling means.

10. A seat slide mechanism, comprising:
a lower rail coupled with a vehicle body and defining a plurality of locking holes longitudinally formed in an inner side wall, the locking holes being spaced apart at equal intervals;
an upper rail in communication with the lower rail, wherein the upper rail is movable forwards and backwards, together with a seat cushion frame, with respect to the lower rail, the upper rail defining a plurality of through-holes in inner and outer side walls thereof for correspondence with the locking holes of the lower rail;
a locking assembly to perform a locking and an unlocking between the lower rail and the upper rail; and
an operating lever for operating the locking assembly, the operating lever having an operating bracket coupled with each end of the operating lever;
wherein the locking assembly includes;
a plurality of pin-shaped lockers for communication with the plurality of through-holes of the upper rail, and engage with the plurality of locking holes of the lower rail, where each of the lockers moves in response to an elastic force of a return spring for locking of the lower rail with the upper rail;
a support means coupled to an inner wall of the upper rail and adapted to guidably support the plurality of pin-shaped lockers such that the lockers move within the plurality of through-holes of the upper rail; and
a pulling means hingeably coupled to the support means and having a plurality of fitting grooves formed at a front end for receiving and retaining the plurality of lockers, whereby the pulling means pivotally rotates when the pulling means is pressed downward by the operating bracket such that the plurality of lockers are removed from the locking holes of the lower rail to unlocked the lower rail from the upper rail.

11. The seat slide mechanism for vehicles according to claim 10, wherein the lockers comprise a circular cross section.

* * * * *